United States Patent [19]

Trumper

[11] E Re. 31,368

[45] Reissued Sep. 6, 1983

[54] FLOUR SYSTEM FOR GRAIN BIN

[75] Inventor: Mark A. Trumper, Sullivan, Ill.

[73] Assignee: Grain Systems, Inc., Assumption, Ill.

[21] Appl. No.: 114,128

[22] Filed: Jan. 21, 1980

Related U.S. Patent Documents

Reissue of:

[64] Patent No.: 4,137,682
Issued: Feb. 6, 1979
Appl. No.: 855,610
Filed: Nov. 29, 1977

[51] Int. Cl.[3] ..... E04B 1/70

[52] U.S. Cl. ..... 52/303; 52/478; 52/588; 52/747

[58] Field of Search ..... 52/263, 588, 303, 478, 52/480, 763, 747

[56] References Cited

U.S. PATENT DOCUMENTS

| | | | |
|---|---|---|---|
| 2,007,354 | 7/1935 | Vass | 52/588 |
| 3,283,459 | 11/1966 | Beranek et al. | 52/263 |
| 3,518,800 | 7/1970 | Tank | 52/480 |
| 3,591,994 | 7/1971 | Steffen | 52/303 X |
| 3,713,264 | 1/1973 | Morgan, Jr. | 52/480 X |
| 3,971,326 | 7/1976 | Svirklys | 52/588 X |
| 4,073,110 | 2/1978 | Kennedy | 52/588 X |

*Primary Examiner*—Price C. Faw, Jr.
*Assistant Examiner*—Carl D. Friedman
*Attorney, Agent, or Firm*—Polster, Polster & Lucchesi

[57] ABSTRACT

A floor system for grain bins or the like in which free-standing support legs are positively connected without mechanical fasteners to interlocking, channel-shaped floor members so as to substantially prevent lateral and vertical relative movement between the floor members and the supports legs.

12 Claims, 6 Drawing Figures

FLOUR SYSTEM FOR GRAIN BIN

Matter enclosed in heavy brackets [ ] appears in the original patent but forms no part of this reissue specification; matter printed in italics indicates the additions made by reissue.

BACKGROUND OF THE INVENTION

This invention relates to a floor system for a grain storage bin and more particularly to a floor system utilizing interconnected floor channels and free-standing floor supports.

Grain storage bins are typically made of corrugated sheet-metal panels bolted together to form a right cylindrical bin and have a conical roof, and are supported on a concrete pad or foundation. As is conventional, an air-permeable grain-supporting floor is provided in the bin above the concrete pad so as to form a plenum chamber between the concrete pad and the grain floor. A fan and air heater assembly located outside the grain bin blows heated air into the plenum so that the heated air flows up through the floor and into the grain for drying or otherwise conditioning the grain. Typically, the grain floor is located about 12 to 18 inches (30 to 45 cm.) above the concrete pad so as to provide a plenum of sufficient height and volume that the static pressure therewithin is substantially uniform under the entire area of the grain floor.

While grain floors have been of various configurations, this invention is particularly concerned with grain bin floors made of elongate, prefabricated metal channels which interlock in side-by-side relation to form a continuous grain floor. Heretofore, these interlocking grain floor channels have been supported above the concrete pad in a variety of ways including stacking concrete blocks on the concrete pad at specified locations to support the floor. More recently, metal supports legs have been used which are free standing on the concrete pad and which engage the bottom of the grain floor channels thus eliminating the use of concrete blocks and permitting air to circulate freely in the plenum. Further these prior free-standing support legs are fast to install because they do not need to be bolted or otherwise fastened to the concrete pad or to the floor members, and no lateral braces between the supports are required.

However, in actual use a serious problem with these prior free-standing support legs has, on occasion, been encountered which has resulted in the catastrophic failure of the grain bin floor upon filling of the bin with grain. More particularly, it is a common practice for the user of a grain bin to test the fan and heater system prior to filling the bin. Upon start-up of the fan, the static pressure in the plenum chamber beneath the grain bin floor is, in many instances, sufficient to lift some or all of the floor in an empty bin up from the free-standing support legs. Since the support legs are free standing (i.e., they are not secured to the concrete pad or to the grain floor), air circulating in the plenum chamber could blow over some of the support legs. Upon turning off the fan, the floor would settle and would be supported in its proper position by the remaining support legs. Since the legs are hidden from view, there is no visual way to check the grain bin to ascertain if the support legs are properly positioned. Upon filling the bin with grain, the weight of the grain would cause a portion of the grain bin floor not properly supported by the support legs to fail, thus spilling the grain into and partially filling the plenum chamber. If the failure is not detected, a large portion of the grain may not be properly dried. Of course, if the failure is detected, the bin must be unloaded and the damaged floor replaced. The unloading of the filled bin with a collapsed floor is a time-consuming job and the repair parts for the grain bin floor may be expensive and require time to order. During the harvest season when the grain bin is primarily used for drying grain, time is of the essence and thus failure of the grain bin floor may not only result in damage to the grain bin, but spoilage of the grain to be dried therein.

SUMMARY OF THE INVENTION

Among the several objects and features of this invention may be noted the provision of a floor system for a grain bin or the like, such as above described, in which free-standing support legs are used and in which these support legs positively engage the grain bin floor members so as to substantially prevent both lateral and vertical movement of the floor members relative to the support legs; the provision of such a floor system which is adapted to bear directly on a concrete foundation and which need not be secured to the foundation; the provision of such a floor system in which the free-standing support legs cannot be blown or otherwise knocked over after installation of the floor thereby insuring the structural integrity of the floor system; the provision of such a floor system which may be readily installed and which does not require the use of fasteners; the provision of such a floor system which is of light weight and yet which is sufficiently strong to withstand the weight of the grain filling the bin; and the provision of such a floor system which is economical to fabricate and to ship.

Briefly, a floor system for a grain bin or the like of this invention comprises a plurality of channel-shaped floor members adapted to be interlocked in side-by-side abutting relation to form a substantially continuous floor surface. The floor surface further includes a plurality of support legs adapted to be secured to the underside of the floor members, to bear against a foundation and to support the floor members above the foundation. Each of the floor members is a one-piece member formed of sheet metal or the like and has a substantially flat web constituting the above-mentioned floor surface of the floor system and a downwardly extending flange at each side of its web. Each of these floor member flanges is approximately perpendicular to the floor member web, and one of the floor member flanges constituting an inside floor flange has an inside leg extending inwardly from its outer end beneath the floor web, this inside leg being substantially parallel to the floor web. A lip extends upwardly from the inner end of the inside floor leg toward the floor web. The other of the floor member flanges constitutes an outside floor flange and it has an outside floor leg extending outwardly beyond the outside floor flange from the lower end thereof and has an outside floor lip extending upwardly from the outer edge of the outside floor leg, whereby the inside flange, leg and lip of one floor member are adapted to be received within the outside flange, leg and lip of a next adjacent floor member so that contiguous floor members are substantially interlocked in side-by-side abutting relation. Each of the support legs comprises a one-piece member formed of sheet metal or the like and is channel shaped in cross-section. Each support leg has a support web, a first support flange at one side of the support web, a second support flange at the other side of the support web, and respecive first and second support lips extending outwardly from the first and second support flanges. Means is provided at the upper end of the support leg for positively engaging and securing the support leg to the floor members, this means comprising a first bearing surface on the upper end of the first support flange adapted to support the outside floor leg of a floor member immediately above the support web. For convenience, this last-mentioned floor member is referred to as an immediate floor member. The support member further includes a second bearing surface on the second support flange adapted to support the outside leg of a next adjacent floor member. The support web of the support leg extends up above the level of the first and second bearing surfaces and has a first side generally contiguous to the inner face of the outside flange of the immediate floor member and a second side generally contiguous to the inner face of the inside flange of the immediate floor member. The first outwardly extending lip of the support member extends above the first bearing surface and is disposed on the outside of the outside lip of the immediate floor member. The second outwardly extending lip of the support member extends above the second bearing surface of the support member and is disposed on the inside of the inner face of the outside flange of its respective next adjacent floor member whereby the first and second support lips and the first and second sides of the support member substantially prevent lateral movement of the support leg with respect to the floor members. The first support lip has a first notch therein for receiving the outside floor lip of the immediate floor member and the second side of the support web has a second notch therein for receiving the inside floor lip of its respective next adjacent floor member whereby with the notches engaging their respective floor lips and with the support bearing surfaces bearing against their respective floor member legs, relative vertical movement between the floor members and the support leg is substantially prevented.

Other objects and features of this invention will be in part apparent and in part pointed out hereinafter.

BRIEF DESCRIPTION OF THE DRAWINGS

Corresponding reference characters indicate corresponding parts throughout the several views of the drawings.

DESCRIPTION OF A PREFERRED EMBODIMENT

Figure 1:
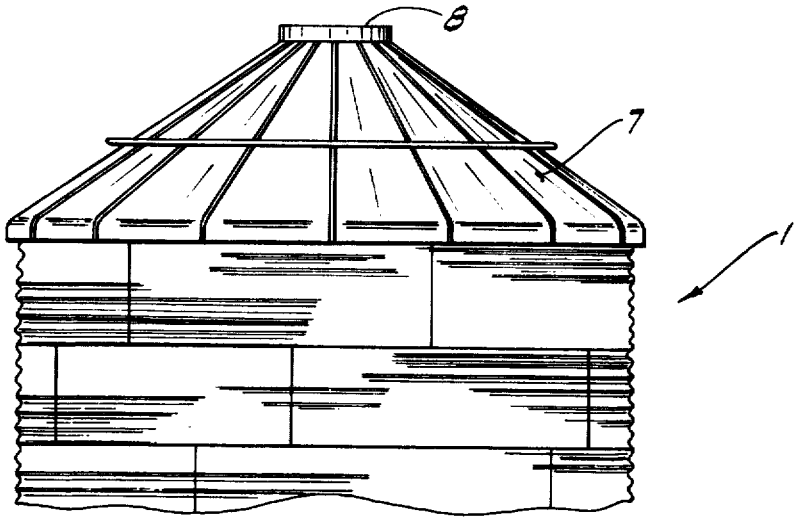
FIG. 1 is a side elevational view of a grain bin with a portion thereof broken away to illustrate a floor system of this invention therein.
Figure 1:
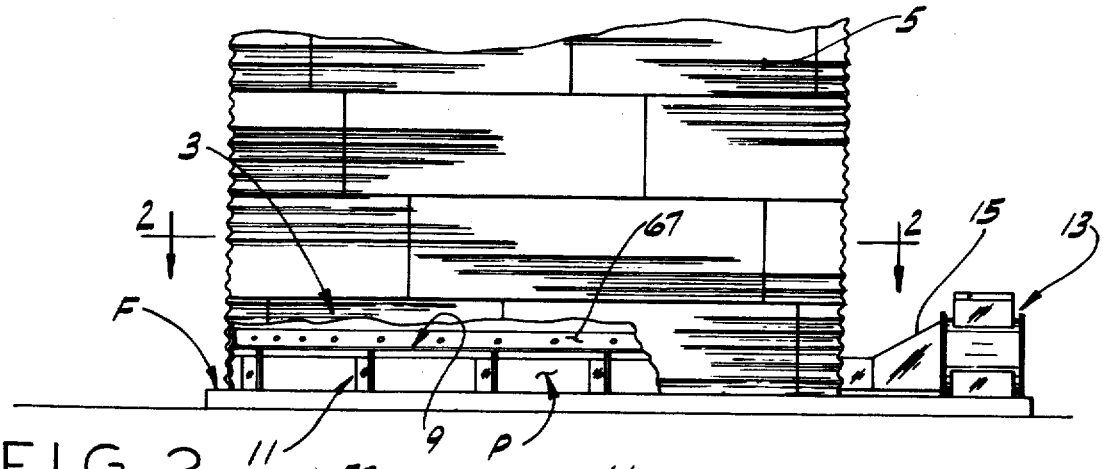

Referring now to the drawings, a grain bin, generally indicated at 1, is shown to have a floor system 3 of this invention installed therein. The grain bin is preferably secured to a poured concrete foundation pad F and has cylindrical side walls 5 of corrugated sheet-metal panels with the corrugations running circumferentially around the bin. The bin has a generally conical roof 7 formed of sheet-metal panels with a center opening 8 at the top through which grain is loaded into the bin. As is conventional, suitable doors (not shown) may be provided in the side walls and roof of the bin as desired.

Figure 2:
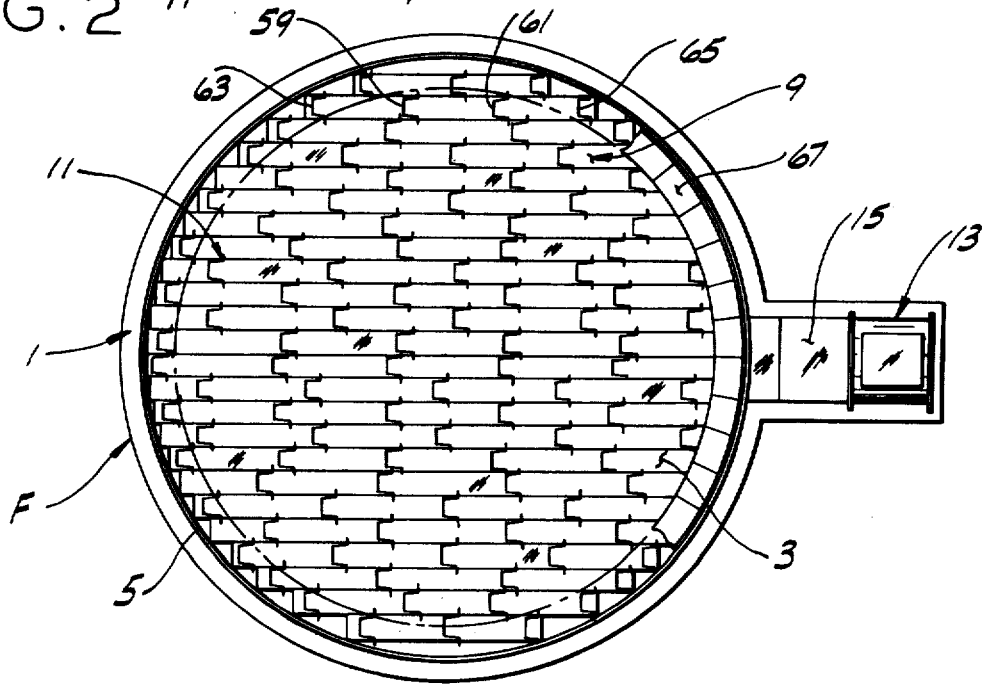
FIG. 2 is a horizontal cross-sectional view of the grain bin taken along line 2—2 of FIG. 1 illustrating in plan a typical floor system of this invention with the locations of support legs for the floor system being indicated in solid lines for the purpose of clarity.

Floor system 3 of this invention comprises a plurality of channel-shaped, elongate, air-permeable floor members 9 interlocked in side-by-side abutting relation with their upper faces or webs constituting a substantially continuous air-permeable floor surface. A plurality of support legs 11 is secured to the underside of the floor members (as shown in FIG. 2) to support the floor members above foundation F with the space between the foundation and the floor members constituting a plenum chamber P. As shown in FIG. 1, a fan and heater unit, such as is commercially available from Grain Systems, Inc., of Assumption, Illinois, is connected to plenum P by a transition duct 15. Thus, the fan may blow air (either heated or of ambient temperature) into the plenum under a relatively low static head pressure, for example 0.5 to 5.0 inches (1.2 to 12.7 cm.) of water. The air in plenum P is thus exhausted upwardly through the air-permeable floor and rises through the grain in the bin to dry, aerate, or otherwise condition the grain. The air is exhausted from the bin via center opening 8 or via other outlets (not shown). The height that floor 3 is raised above foundation F will vary depending on bin size, fan size, type of unloading equipment used in the bin, and other factors. However, the length of support legs 11 generally ranges between about 12 and 17 inches (30 and 40 cm.).

Figure 5:
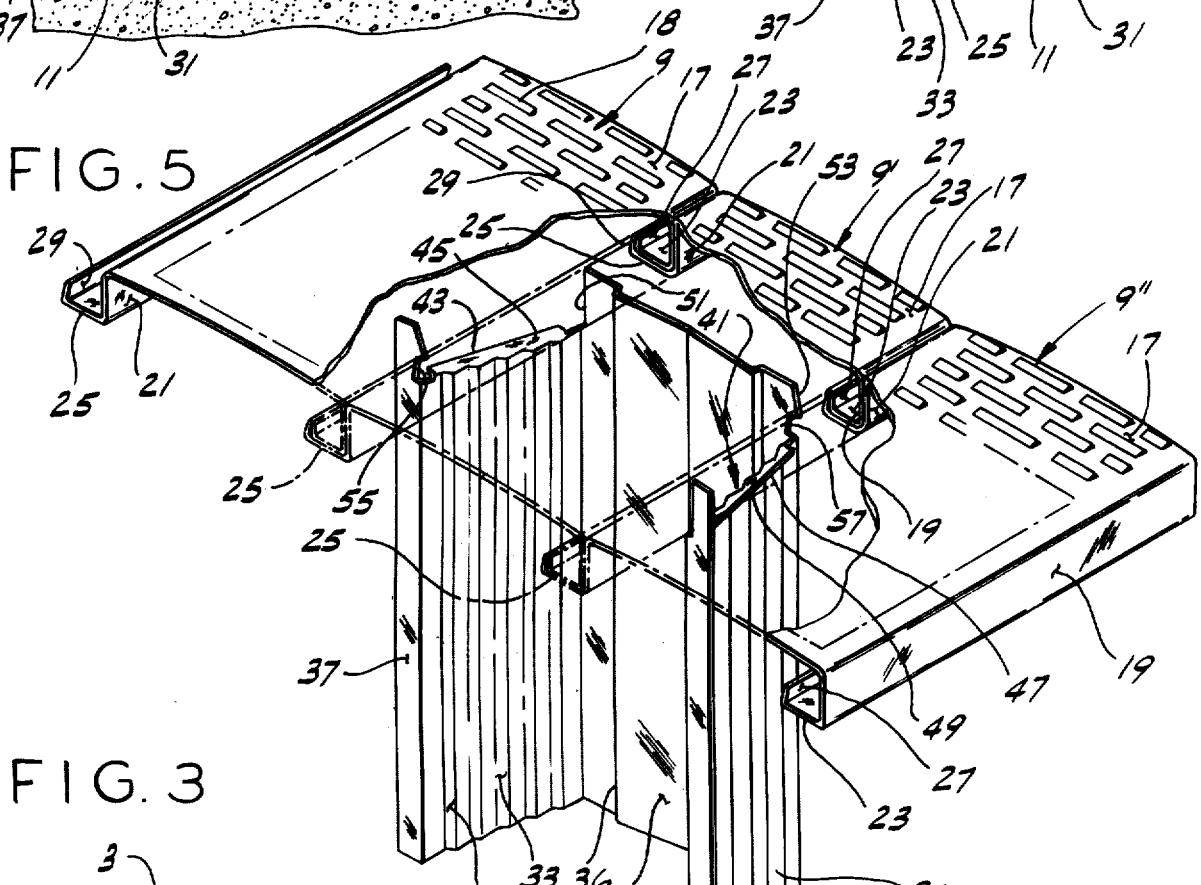
FIG. 5 is an enlarged perspective view of a portion of the floor system of this invention showing three floor members interlocked in side-by-side abutting relation and a support leg secured to the underside of one of the floor members constituting an immediate floor member.

As best shown in FIG. 5, each floor member 9 is an elongate, one-piece channel formed of sheet metal (e.g., 20-gauge galvanized commercial steel or the like) and has a substantially flat web 17 with elongate transverse air slots 18 formed therein. Slots 18 are of such width as to prevent grain from passing therethrough, but yet enable air to readily flow upwardly from plenum chamber P into the grain. As heretofore mentioned, the upper horizontal surfaces of floor webs 17 constitute the substantially continuous flat floor surfaces of the grain bin floor. Each floor member further includes a pair of flanges extending downwardly from web 17 with the flange at one side of the web being referred to as an inside floor member flange and indicated at 19, and with the other flange being referred to as an outside floor member flange and indicated at 21. Each of these floor member flanges is generally perpendicular to floor member web 17. The inside floor member flange has an inside leg 23 extending inwardly from the lower end of the inside floor member flange beneath floor member web 17, and the outside floor member flange has a respective outside leg 25 extending outwardly from the lower end of the outside floor member flange beyond the floor member. These legs are generally parallel to floor member web 17. An inside lip 27 projects upwardly toward floor member web 17 from the end of inside leg 23 and an outside lip 29 projects upwardly from the outer end of outside leg 25. As is shown in FIG. 5, inside flange 19, inside leg 23, and inside lip 27 of one floor member are adapted to be snugly received within the outside flange 21, outside leg 25 and outside lip 27 of a next adjacent floor member so that the two adjacent floor members are interlocked or securely fastened together in side-by-side abutting relation with their respective inside and outside flanges 19 and 21 in contiguous relaton and with the horizontal planes of their webs 17 coplanar.

As also shown in FIG. 5, each support leg 11 is a one-piece channel-shaped member fabricated of sheet metal, preferably of galvanized commercial steel. The thickness of the sheet metal from which support legs 11 are fabricated may be varied in accordance with the diameter and height of grain bin 1 in which the floor support system of this invention is to be used so that the support legs will have sufficient strength to support the grain. In certain installations, support legs of heavier gauge material are used in specified locations, while support legs of thinner gauge material may be used at other locations.

Each support leg 11 is shown to comprise a support web 31, a first support flange 33 at one side of the support web, and a second support flange 35 at the other side of the support web. These first and second support flanges have a first lip 37 and a second lip 39, respectively, extending outwardly therefrom and being generally parallel to the plane of support web 31. Support web 31 and support flanges 33 and 35 have longitudinal joggles or flutes 36 therein to increase their moments of inertia and thus their stiffness and resistance to buckling under compression column loading.

In accordance with the floor system 3 of this invention, support legs 11 are each provided with means, as generally indicated at 41, for positively securing the support legs to the underside of floor members 9 so as to substantially prevent relative lateral and vertical movement between the support legs and the floor members. This securing means includes a first bearing surface 43 formed by an outwardly bent flange or shoulder 45 at the upper end of the first support flange 33. This first bearing surface supports the outside leg 25 of a floor member 9 immediately thereabove, this last-mentioned floor member being referred to as an immediate floor member and being indicated in FIG. 5 at 9'. Support leg 11 further includes a bearing surface 47 formed by an outwardly extending flange or shoulder 49 at the upper end of the second support flange 35. This second bearing surface supports the outside leg 25 and outside flange 21 of the next adjacent floor member indicated at 9'' in FIG. 5. Support flanges 33 and 35 angle outwardly from support web 31 so that bearing surfaces 43 and 47 extend diagonally across their respective floor member legs.

Support web 31 extends up above the level of bearing surfaces 43 and 47 and has a first side edge 51 and a second side edge 53. The width of support web 31 between its above-mentioned side edges is such that with the support leg positioned as shown in FIG. 5 relative to its immediate floor member 9', the support web fits snugly but yet freely between flanges 19 and 21 of its immediate floor member with its first side 51 contiguous the inner face of floor flange 21 and its second side 53 contiguous the inner face of its floor flange 19. The first support lip 35 extends up above the level of the first bearing surface 43 (see FIG. 6) to constitute a tab on the outside of outside lip 29 of its immediate floor member 9'. The upper end of support lip 39 extends up above the level of bearing surface 47 thus constituting a second tab adjacent the inner face of the outside flange 21 of the next adjacent floor member 9''. Thus, the first and second sides 51 and 53 of support web 31 and the upper ends of support lips 37 and 39 engage the floor members in such manner as to substantially prevent lateral movement between support leg 11 and floor members 9.

Support web 31 extends above the level of bearing surfaces 43 and 47 a distance such that it engages the underside of floor member web 17 to support the latter between its inside and outside flanges 19 and 21. As is best seen in FIG. 5, support web 31 is so formed that its upper edge is not a straight line but is rather irregular. This insures that the upper edge of the support web bridges the gaps formed in floor web 17 by slots 18 and thus distributes loading over the length of support web 31.

Figure 6:
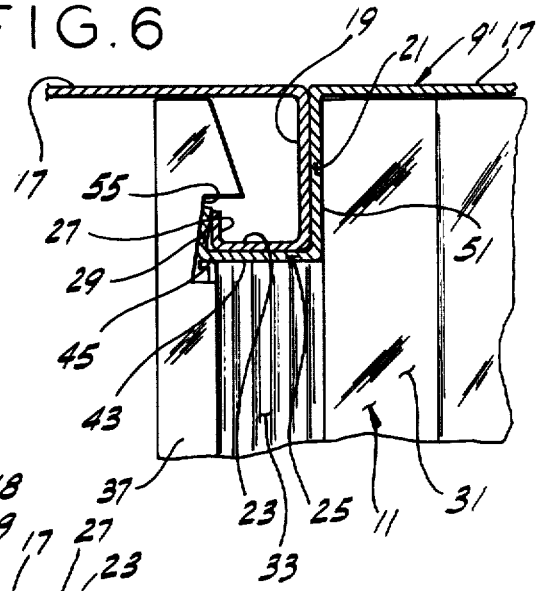
FIG. 6 is an enlarged elevational view of the upper portion of a support leg and of the floor members interlocked and supported by the support leg illustrating details of the means for positively securing the support legs to the undersurface of the floor members.

As is best seen in FIG. 6, the upper end of first support lip 37 has a first notch 55 therein for receiving the outside lip 29 of immediate floor member 9' with a portion of the support lip 37 defining the upper edge of notch 55 being disposed above the upper edge of outside floor lip 29. Thus, with outside floor lip 29 received in first notch 55 and with outside floor flanges 25 bearing on bearing surface 43, relative vertical movement between the floor members and the support members is substantially prevented. As shown in FIG. 5, a second notch 57 is provided in second side edge 53 of support web 31 for receiving the outside floor lip 29 of the next adjacent floor member 9'' with a portion of support web 31 defining the upper edge of second notch 57 overlying the upper edge of the last-said outside floor member lip. Thus, with the outside lip 29 of the next adjacent floor member received in second notch 57 and with the bottom outside leg 25 of the next adjacent floor member bearing on bearing surface 47, relative vertical movement between the support and the next adjacent floor member is also substantially prevented. Still further it will be appreciated that while the above-described securing means 41 may permit support leg 11 to be slid lengthwise along floor members 9, the support leg cannot be rotated (i.e., tipped) in fore-and-aft direction relative to the floor members and thus cannot be inadvertently knocked over in either lateral or fore-and-aft direction.

Figure 4:
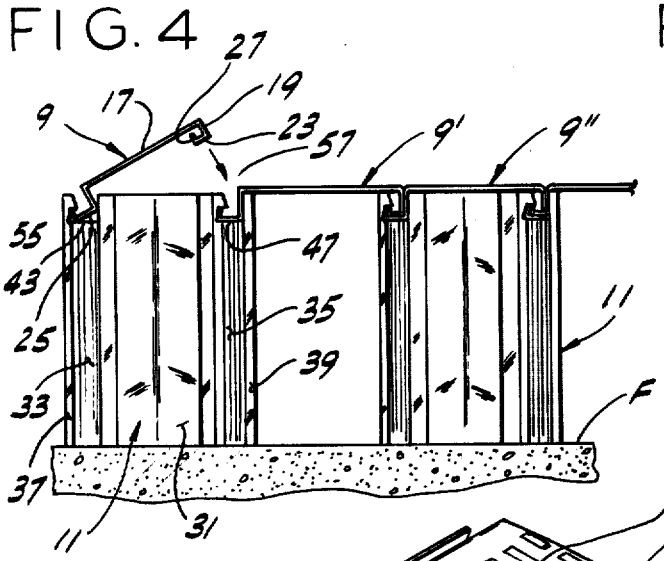
FIG. 4 is an end elevational view of the portion of the floor system, as it is shown in FIG. 3.
Figure 3:
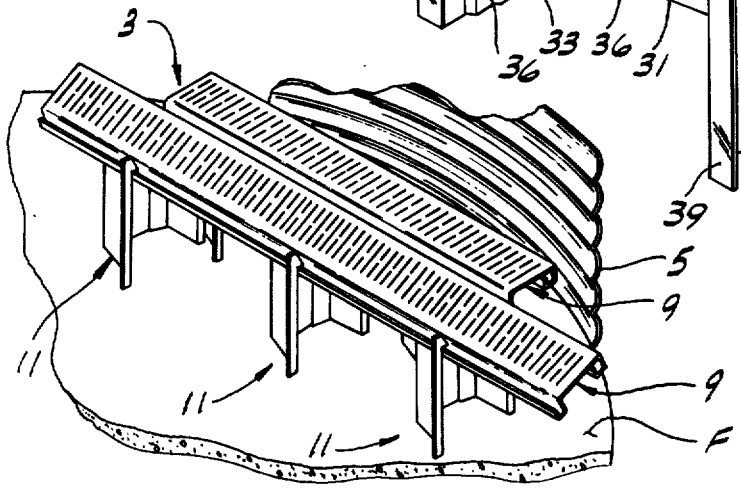
FIG. 3 is a perspective view illustrating a portion of the floor system of this invention as it is being installed within the grain bin.

As shown in FIGS. 3 and 4, floor system 3 of this invention is preferably installed in a circular grain bin 1 by first placing the shortest length floor member 9 adjacent the wall of the bin. As shown in FIG. 2, three support legs 11 are required for this first floor member. At locations, as indicated at 59 and 61 in FIG. 2, additional support legs 11 are positioned to bear on foundation F to receive the next floor member of the floor system. More specifically, the support legs at locations 59 and 61 are positioned so that their bearing surfaces 47 engage the bottom face of outside leg 25 of the first-placed floor member and so that the outside lip 29 of the first-placed floor member is received in second notches 57 of the support legs at positions 59 and 61. This properly locates the support legs at positions 59 and 61 relative to the first-placed floor member. It will be noted that each interior floor member 9 in FIG. 2 is thus supported by the support legs immediately therebelow and by the support legs to the immediate right and left thereof. However, in bins of other sizes, support legs may only be required for every other floor member (see FIG. 4).

The next floor member 9 to be placed is then installed on the now correctly located support legs at positions 59 and 61 by inserting its outside lip 29 in the first notches 55 of the last-mentioned support legs and by rotating the floor member downwardly on the bend line between its outside leg 25 and lip 29 so that its inside flange 19, inside leg 23, and inside lip 27 are received within the outside flange 21, the outside leg 25, and the outside lip 29 of the first-placed floor member. As the last-placed floor member is rotated downwardly, its inside lip, inside leg and inside flange snap into position. This may be accomplished by a workman placing his foot over the inside flange of the last-placed floor member and applying his weight thereto. In this manner adjacent floor members and support legs are positively interlocked. Additional support legs at locations 63 and 65 (see FIG. 2) are then installed at the ends of this last-installed floor member. The remainder of the floor members are then installed on after the other in a manner similar to that described above until the entire floor system 3 is complete. As is conventional, flashing 67 is then installed around the outer margin of the floor system and the inside walls of the grain bin to prevent grain from falling through gaps between the ends of the floor members and the bins.

The bin shown in FIG. 2 is 15 feet (4.5 m.) in diameter and requires approximately 114 support legs 11. Bins of larger size require more support legs. For example, a 48-foot (14.6 m.) diameter bin may require about 1126 support legs.

In view of the above, it will be seen that the several objects of the invention are achieved and other advantageous results attained.

As various changes could be made in the above constructions without departing from the scope of the invention, it is intended that all matter contained in the avove description or shown in the accompanying drawings shall be interpreted as illustrative and not in a limiting sense.

What is claimed is:

1. A floor system for grain bins or the like comprising a plurality of channel-shaped floor members adapted to be interlocked in side-by-side abutting relation to form a substantially continuous floor surface and a plurality of vertical supports adapted to be secured to the underside of said floor members and to support the floor members above a foundation or the like, each of said floor members being a one-piece member formed of sheet metal or the like and having a substantially flat web constituting the horizontal surface of said floor system and a downwardly extending flange at each side of the web, one of said flanges constituting an inside floor flange having an inside leg extending inwardly from the outer end of said inside floor flange beneath said floor web, said inside leg being substantially parallel to said floor web, and a lip extending upwardly toward said floor web from the inner end of said inside floor leg, the other of said floor flanges constituting an outside floor flange having an outside floor leg extending outwardly from the lower end thereof beyond the outside floor flange and an outside floor lip extending upwardly from the outer edge of said outside floor leg whereby the inside flange, leg and lip of one floor member are adapted to be received within the outside flange, leg and lip of a next adjacent floor member so that adjacent floor members are substantially interlocked in side-by-side abutting relation; each of said supports comprising a one-piece member of sheet metal or the like and being channel shaped in cross-section, said support having a support web, a first support flange at one side of the support web, a second support flange at the other side of the support web, said first and second support flanges each having a respective support lip at the outer ends thereof extending outwardly, and means at the upper end of the support for positively engaging and securing said support to said floor members, this last-said means comprising a first bearing surface on the upper end of said first support flange adapted to support the outside floor leg of a floor member immediately above said support web, this last-said floor member being referred to as an immediate floor member and a second side generally contiguous to the inner face of the inside flange of said immediate floor member, a second bearing surface on said second support flange adapted to support the outside leg of a next adjacent floor member, said support web extending up above the level of said first and second bearing surfaces and having a first side generally contiguous to the inner face of the outside flange of said immediate floor member and a second side generally contiguous to the inner face of the inside flange of said immediate floor member, said first support lip extending above said first bearing surface and being disposed on the outside of the lip of said outside flange of said immediate floor member, said second support lip extending above said second bearing surface and being disposed on the inner face of the outside flange of its respective next adjacent floor member whereby said first and second support lips and said first and second sides of said support web substantially prevent lateral movement of said support leg relative to said floor members, said first support lip having a first notch therein for receiving the outside floor lip of said immediate floor member, and said second side of said support web having a second notch therein for receiving said outside floor lip of its respective next adjacent floor member with the inside floor lip of said immediate floor member being snugly received in said outside floor lip of said next adjacent floor member whereby with said respective floor lips being received in their respective notches, and with said support bearing surfaces bearing against their respective floor legs and with said inside lip, leg and flange of said immediate floor member received in the outside lip, leg and flange of the next adjacent floor member, relative vertical movement between said floor members and said supports is substantially prevented.

2. A floor system as set forth in claim 1 wherein said floor member webs have a plurality of transverse slots therein of such width as to prevent the passage of grain therethrough and to permit air from below said floor to be blown into the grain.

3. A floor system as set forth in claim 1 wherein said first and second support bearing surfaces are each constituted by a horizontal shoulder extending from the upper ends of said first and second support flanges, and wherein said shoulders of said first and second support flanges of each support leg angle outwardly whereby said first and second support bearing surfaces extend from one side to the other of their respective outside floor member legs engageable therewith.

4. A floor system as set forth in claim 1 wherein said support flanges have longitudinal flutes therein for stiffening the support against buckling.

5. A floor system as set forth in claim 1 wherein said first support lip of said support has a portion defining the upper edge of said first notch disposed above the upper edge of the outside floor lip of said immediate floor member, and wherein said support web has a portion defining the upper edge of said second notch disposed above the upper edge of the inside floor lip of said immediate floor member and above the upper edge of the outside floor lip of said next adjacent floor member, said portions of said notches extending out over the floor member lips disposed in their respective notches so as to prevent vertical movement of said floor members with respect to said support and to permit the floor members to be snapped into position on its support thus positively interconnecting said supports to said floor members.

6. In a floor system for a grain bin or the like comprising a plurality of floor members interlocked in side-by-side abutting relation to form a substantially continuous floor surface and a plurality of vertical supports adapted to be secured to the underside of said floor members to support said floor members above a foundation, each of said floor members being a one-piece member of formed sheet metal or the like and being channel shaped in cross-section and having a substantially flat web constituting the horizontal floor surface of said floor system and a downwardly extending flange at each side of the floor web, each of said floor flanges being approximately perpendicular to said floor web, one of said floor flanges constituting an inside floor flange having an inner leg extending inwardly from the outer end of said inside floor flange beneath said floor web, said inside leg being substantially parallel to said floor web, and a lip extending upwardly toward said floor web from the inside of said inside leg, the other of said floor flanges constituting an outside floor flange having an outside leg extending outwardly beyond said outside floor flange from the lower end thereof and an outside lip extending upwardly from the outer edge of said outside leg whereby the inside flange, leg and lip of one floor member are adapted to be received within the outside flange, leg and lip of ana adjacent floor member so that contiguous floor members are interlocked in side-by-side abutting relation, each of said supports comprising a one-piece member formed of sheet metal or the like and being channel shaped in cross section, said support having a support web, a first support flange at one side of the support web, and a second support flange at the other side of the support web, said first and second support flanges each having a respective support lip at the outer ends thereof extending outwardly: wherein the improvement comprises means at the upper end of the support for positively securing the support to said floor members including a first bearing flange on the upper end of said first support flange adapted to support the outside leg of the floor member immediately thereabove, this last-said floor member being referred to as an immediate floor member, a second bearing flange of the upper end of said second support flange adapted to support the outside leg of the next adjacent inner floor member, said support web extending up above the level of said first and second bearing flanges and having a first side generally contiguous to the inner face of the outside flange of said immediate floor member and a second side generally continguous to the inner face of the inside flange of said immediate floor members, said first support lip extending above said first support bearing flange and being disposed on the outside of the lip of said outside flange of said immediate floor member, said second support lip extending above said second support bearing flange and being disposed on the inner face of the inside flange of the next adjacent inner floor member whereby said first and second support lips and said first and second sides of said support web substantially prevent lateral movement of said support relative to said floor members, said first support lip having a first notch therein for receiving the outside floor lip of said immediate floor member, said second support side having a second notch therein for receiving said outside floor lip of the next adjacent floor member, said first support lip further having an edge defining a portion of said first notch overlying the upper edge of said outside floor lip of said immediate floor member and said support web having an edge defining a portion of said second notch overlying the upper edge of said outside floor lip of the next adjacent floor member and the upper edge of the inside floor lip of said immediate floor member whereby with said support bearing surfaces bearing against their respective floor legs and with said notches receiving the respective floor lips, relative vertical movement between said floor members and said supports is substantially prevented.

7. The method of installing interlocking channel shaped floor members in side-by-side abutting relation on free-standing, vertical, channel shaped support legs resting on a foundation to form a substantially continous floor for a grain bin or the like, each of said floor members being a one-piece member of formed sheet metal or the like and being channel-shaped in cross-section and having a substantially flat web constituting the horizontal floor surface of said floor system and a downwardly extending flange at each side of the floor web, each of said floor flanges being approximately perpendicular to said floor web, one of said floor flanges constituting an inside flange having an inner leg extending inwardly from the outer end of said inside floor flange beneath said floor web, said inside leg being substantially parallel to said floor web, and a lip extending upwardly toward said floor web from the inside of said inside leg, the other of said floor flanges constituting an outside floor flange and having an outside leg extending outwardly beyond the outside floor flange from the lower end thereof and an outside lip extending upwardly from the outer edge of said outside leg whereby the inside flange, leg and lip of one floor member are adapted to be received within the outside flange, leg and lip of an adjacent floor member so that contiguous floor members are interconnected in side-by-side abutting relation, each of said supports comprising a one-piece member formed of sheet metal or the like and being channel shaped in cross section, said support having a support web, a first support flange at one side of the support web, and a second support flange at the other side of the support web, said first and second support flanges each having a respective support lip at the outer ends thereof extending outwardly, said support having a first bearing flange on the upper end of said first support flange, a second bearing flange on the upper end of said second support flange, a first notch in said first support lip, and a second notch in said support web, wherein the method comprises:

placing a plurality of said supports on said foundation for supporting the floor members;

inserting the outside floor lip of one of said floor members constituting a first floor member in the first notches of its supports and rotating said first floor member downwardly so that its inside floor lip is snapped into position in the second notches of its supports; and inserting the outside floor lip of a next-to-be-installed floor member in the first notches of its supports and rotating this next to be installed floor member downwardly on its supports so that its inside floor lip is snugly received in the outside floor lip of the previously installed floor member and so that it is snapped into position in said second notches of its supports thereby to interlock the installed floor members together in said side-to-side abutting relation and to positively interconnect the floor members to their supports so as to prevent relative vertical movement of said supports in said floor members.

*8. In a floor system for a grain bin having a plurality of side-by-side floor members interlocked together and a plurality of channel-shaped floor support members bearing on a foundation and supporting said floor members above the foundation, wherein the improvement comprises: each of said floor support members having means thereon for snap fit securement of said floor support member onto said floor members so as to prevent relative vertical movement between said floor members and said floor support members.*

*9. In a floor support system as set forth in claim 8 wherein each of said channel-shaped floor support members has a support web, a first flange at one side of the support web and a second flange at the other side of said support web, at least one of said flanges having a support lip at the outer end thereof, a bearing surface at the upper end of each of said support flanges for engagement by portions of said floor members, said support web and said support lip extending above the level of said bearing surfaces for preventing relative lateral movement between said floor members and said floor support members, said snap fit securement means comprising a notch in the portions of said floor support member extending above the level of said bearing surfaces for the snap fit reception of a portion of said flooring members thereby to prevent relative vertical movement between said flooring members and said floor support member.*

*10. In a floor support system as set forth in claim 9 further having a second notch in said portions of said floor support members above the level of said bearing surfaces for the snap fit reception of other portions of said floor members with one of said notches being in said support lip on one side of said floor support member and with the other of said notches being in said support web on the other side of said floor support member.*

*11. In a floor system for a grain bin or the like comprising a plurality of floor members interlocked in side-by-side abutting relation to form a substantially continuous floor surface and a plurality of vertical supports adapted to be secured to the underside of said floor members to support said floor members above a foundation, each of said floor members being a one-piece member of formed sheet metal or the like and being channel-shaped in cross-section and having a substantially flat web constituting the horizontal floor surface of said floor system and a downwardly extending flange at each side of the floor web, one of said floor flanges constituting an inside floor flange having an inner leg extending inwardly from the outer end of said inside floor flange beneath said floor web, said inside leg being substantially parallel to said floor web, and a lip extending upwardly toward said floor web from the inside of said inside leg, the other of said floor flanges constituting an outside floor flange having an outside leg extending outwardly beyond said outside floor flange from the lower end thereof and an outside lip extending upwardly from the outer edge of said outside leg whereby the inside flange, leg and lip of one floor member are adapted to be received within the outside flange, leg and lip of an adjacent floor member so that contiguous floor members are interlocked in side-by-side abutting relation, each of said supports comprising a one-piece member formed of sheet metal or the like and being channel-shaped in cross-section, said support having a support web, a first support flange at one side of the support web, and a second support flange at the other side of the support web, said first and second support flanges each having a respective support lip at the outer ends thereof extending outwardly: wherein the improvement comprises means at the upper end of the support for positively securing the support to said floor members including a first bearing surface on the upper end of said first support flange adapted to support the outside leg of the floor member immediately thereabove, this last-said floor member being referred to as an immediate floor member, a second bearing surface of the upper end of said second support flange adapted to support the outside leg of the next adjacent inner floor member, said support web extending up above the level of said first and second bearing flanges and having a first side generally contiguous to the inner face of the outside flange of said immediate floor member and a second side generally contiguous to the inner face of the inside flange of said immediate floor members, said first support lip extending above said first support bearing surface and being disposed on the outside of the lip of said outside flange of said immediate floor member, said second support lip extending above said second support bearing flange and being disposed on the inner face of the inside flange of the next adjacent inner floor member whereby said first and second support lips and said first and second sides of said support web substantially prevent lateral movement of said support relative to said floor members, said portions of said support lips and said portion of said support web extending above the level of said bearing surfaces being referred as upwardly extending portions, the latter having at least one notch therein for the snap-fit reception of a floor lip of a respective floor member whereby with said legs of said floor members bearing on said support bearing surfaces and with said floor lip of said respective floor member received in said notch, relative vertical movement between said floor members and said supports is substantially prevented.*

*12. The method of installing interlocking channel-shaped floor members in side-by-side abutting relation on free-standing, vertical, channel-shaped support legs resting on a foundation to form a substantially continuous floor for a grain bin or the like, each of said floor members being a one-piece member of formed sheet metal or the like and being channel-shaped in cross-section and having a substantially flat web constituting the horizontal floor surface of said floor system and a downwardly extending flange at each side of the floor web, each of said floor flanges being approximately perpendicular to said floor web, one of said floor flanges constituting an inside flange having an inner leg extending inwardly from the outer end of said inside floor flange beneath said floor web, said inside leg being substantially parallel to said floor web, a lip extending upwardly toward said floor web from the inside of said inside leg, the other of said floor flanges constitutes an*

*outside floor flange having an outside leg extending outwardly beyond the outside floor flange from the lower end thereof and an outside lip extending upwardly from the outer edge of said outside leg whereby the inside flange, leg and lip of one floor member are adapted to be received within the outside flange, leg and lip of an adjacent floor member so that contiguous floor members are interconnected in side-by-side abutting relation, each of said supports comprising a one-piece member formed of sheet metal or the like and being channel-shaped in cross-section, said support having a support web, a first support flange at one side of the support web, and a second support flange at the other side of the support web, said first and second support flanges each having a respective support lip at the outer ends thereof extending outwardly, said support having a first bearing surface on the upper end of said first support flange, a second bearing surface on the upper end of said second support flange, a notch in said first support lip, wherein the method comprises:*

*placing a plurality of said supports on said foundation for supporting the floor members;*

*inserting the inside floor lip of one of said floor members constituting a first floor member on the second bearing support surfaces of its supports and rotating said first floor member downwardly so that its outside floor lip is snapped into position in the notches of its supports; and*

*inserting the inside floor flange and inside floor lip of a next-to-be-installed floor member in the outside floor flange of the first floor member and rotating this next to be installed floor member downwardly on its supports so that its inside floor lip is snugly received in the outside floor flange and lip of the previously installed floor member and so that it is snapped into position in said notches of its supports thereby to interlock the installed floor members together in said side-to-side abutting relation and to positively interconnect the floor members to their supports so as to prevent relative vertical movement of said supports in said floor members.*

* * * * *

UNITED STATES PATENT AND TRADEMARK OFFICE

CERTIFICATE OF CORRECTION

PATENT NO. : Re. 31,368

DATED : September 6, 1983

INVENTOR(S) : Mark A. Trumper

It is certified that error appears in the above—identified patent and that said Letters Patent is hereby corrected as shown below:

Claims 8 and 9 should read as follows:

8. In a floor system for a grain bin having a plurality of side-by-side floor members interlocked together and a plurality of generally vertical channel-shaped floor support members bearing on a foundation and supporting said floor members above the foundation, wherein the improvement comprises: each of said floor support members having means thereon for snap fit securement of said floor support member onto said floor members so as to prevent relative vertical movement between said floor members and said floor support members, each of said channel-shaped floor support members having a web, a first flange at one side of the web and a second flange at the other side of said web, a bearing surface at the upper end of each of said support flanges engageable with portions of said floor members, said floor support member having at least one portion extending above the level of said bearing surfaces for preventing relative lateral movement between said floor members and said floor support member, said snap fit securement means comprising a notch in the portions of said floor support member extending above the level of said bearing surfaces for the snap fit reception of a portion of said flooring members thereby to prevent relative vertical movement between said flooring members and said floor support member.

UNITED STATES PATENT AND TRADEMARK OFFICE

CERTIFICATE OF CORRECTION

PATENT NO. : Re. 31,368

DATED : September 6, 1983

INVENTOR(S) : Mark A. Trumper

It is certified that error appears in the above—identified patent and that said Letters Patent is hereby corrected as shown below:

9. In a floor support system for a grain bin having a plurality of side-by-side floor members interlocked together and a plurality of channel-shaped floor support members bearing on a foundation and supporting said floor members above the foundation, wherein the improvement comprises: each of said floor support members having means thereon for snap fit securement of said floor support member onto said floor members so as to prevent relative vertical movement between said floor members and said floor support members, each of said channel-shaped floor support members having a support web, a first flange at one side of the support web and a second flange at the other side of said support web, at least one of said flanges having a support lip at the outer end thereof, a bearing surface at the upper end of each of said support flanges for engagement by portions of said floor members, said support web and said support lip extending above the level of said bearing surfaces for preventing relative lateral movement between said floor members and said floor support members, said snap fit securement means comprising a notch in the portions of said floor support member extending above the level of said bearing surfaces for the snap fit reception of a portion of said flooring members

UNITED STATES PATENT AND TRADEMARK OFFICE

CERTIFICATE OF CORRECTION

PATENT NO. : Re. 31,368

DATED : September 6, 1983

INVENTOR(S) : Mark A. Trumper

It is certified that error appears in the above-identified patent and that said Letters Patent is hereby corrected as shown below:

thereby to prevent relative vertical movement between said flooring members and said floor support member.

Signed and Sealed this

*Thirty-first* Day of *July 1984*

[SEAL]

*Attest:*

GERALD J. MOSSINGHOFF

*Attesting Officer* *Commissioner of Patents and Trademarks*

REEXAMINATION CERTIFICATE (1019th)

United States Patent [19]

Trumper

[11] B1 Re. 31,368

[45] Certificate Issued Mar. 7, 1989

[54] FLOUR SYSTEM FOR GRAIN BIN

[75] Inventor: Mark A. Trumper, Sullivan, Ill.

[73] Assignee: Grain Systems, Inc., Assumption, Ill.

Reexamination Request:
No. 90/001,496, Apr. 11, 1988

Reexamination Certificate for:

| | |
|---|---|
| Patent No.: | **Re. 31,368** |
| Issued: | **Sep. 6, 1983** |
| Appl. No.: | **114,128** |
| Filed: | **Jan. 21, 1980** |

Related U.S. Patent Documents

Reissue of:

| | | |
|---|---|---|
| [64] | Patent No.: | **4,137,682** |
| | Issued: | **Feb. 6, 1979** |
| | Appl. No.: | **855,610** |
| | Filed: | **Nov. 29, 1977** |

Certificate of Correction issued Jul. 31, 1984.

[51] Int. Cl.[4] ..... F04B 1/70

[52] U.S. Cl. ..... 52/303; 52/478; 52/588; 52/747

[56] References Cited

U.S. PATENT DOCUMENTS

| | | | |
|---|---|---|---|
| 2,007,354 | 7/1935 | Vass | 52/588 |
| 3,283,459 | 11/1966 | Beranek et al. | 52/263 |
| 3,518,800 | 7/1970 | Tank | 52/480 |
| 3,591,994 | 7/1971 | Steffen | 52/303 X |
| 3,713,264 | 1/1973 | Morgan, Jr. | 52/480 X |
| 3,971,326 | 7/1976 | Svirklys | 52/588 X |
| 4,073,110 | 2/1978 | Kennedy | 52/588 X |

OTHER PUBLICATIONS

Grain Bin Drying Floor Steel Support layout–Bush Hog Eaton, dated 12–08–75.

Report–Load Testing–Omaha Testing Laboratories, Inc., dated 07–23–76.

Drawing–Reed Steel Products–Rockford Machine Tool Co., dated 12–14–67.

*Primary Examiner*—Carl Friedman

[57] ABSTRACT

A floor system for grain bins or the like in which free-standing support legs are positively connected without mechanical fasteners to interlocking, channel-shaped floor members so as to substantially prevent lateral and vertical relative movement between the floor members and the supports legs.

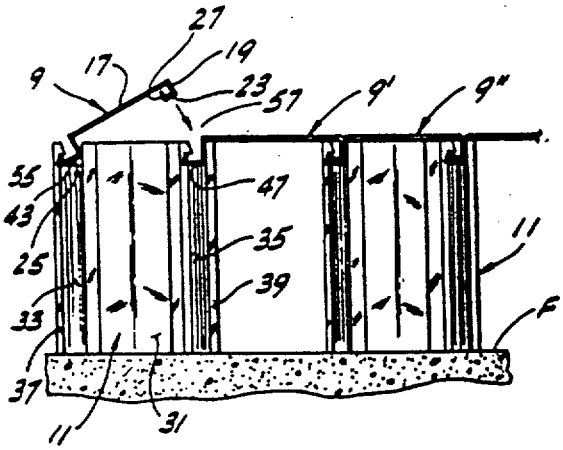

REEXAMINATION CERTIFICATE ISSUED UNDER 35 U.S.C. 307

THE PATENT IS HEREBY AMENDED AS INDICATED BELOW.

Matter enclosed in heavy brackets [] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 6–12 is confirmed.

Claims 1 and 5 are determined to be patentable as amended.

Claims 2–4, dependent on an amended claim, are determined to be patentable.

1. A floor system for grain bins or the like comprising a plurality of channel-shaped floor members adapted to be interlocked in side-by-side abutting relation to form a substantially continuous floor surface and a plurality of vertical supports adapted to be secured to the underside of said floor members and to support the floor members above a foundation or the like, each of said floor members being a one-piece member formed of sheet metal or the like and having a substantially flat web constituting the horizontal surface of said floor system and a downwardly extending flange at each side of the web, one of said flanges constituting an inside floor flange having an inside leg extending inwardly from the outer end of said inside floor flange beneath said floor web, said inside leg being substantially parallel to said floor web, and a lip extending upwardly toward said floor web from the inner end of said inside floor leg, the other of said floor flanges constituting an outside floor flange having an outside floor leg extending outwardly from the lower end thereof beyond the outside floor flange and an outside floor lip extending upwardly from the outer edge of said outside floor leg whereby the inside flange, leg and lip of one floor member are adapted to be received within the outside flange, leg and lip of a next adjacent floor member so that adjacent floor members are substantially interlocked in side-by-side abutting relation; each of said supports comprising a one-piece member of sheet metal or the like and being channel shaped in cross-section, said support having a support web, a first support flange at one side of the support web, a second support flange at the other side of the support web, said first and second support flanges each having a respective support lip at the outer ends thereof extending outwardly, and means at the upper end of the support for positively engaging and securing said support to said floor members, this last-said means comprising a first bearing surface on the upper end of said first support flange adapted to support the outside floor leg of a floor member immediately above said support web, this last-said floor member being referred to as an immediate floor member [and a second side generally contiguous to the inner face of the inside flange of said immediate floor member], a second bearing surface on said second support flange adapted to support the outside leg of a next adjacent floor member, said support web extending up above the level of said first and second bearing surfaces and having a first side generally contiguous to the inner face of the outside flange of said immediate floor member, said first support lip extending above said first bearing surface and being disposed on the outside of the lip of said outside flange of said immediate floor member, said second support lip extending above said second bearing surface and being disposed on the inner face of the outside flange of its respective next adjacent floor member whereby said first and second support lips and said first and second sides of said support web substantially prevent lateral movement of said support leg relative to said floor members, said first support lip having a first notch therein for receiving the outside floor lip of said immediate floor member, and said second side of said support web having a second notch therein for receiving said outside floor lip of its respective next adjacent floor member with the inside floor lip of said immediate floor member being snugly received in said outside floor lip of said next adjacent floor member whereby with said respective floor lips being received in their respective notches, and with said support bearing surfaces bearing against their respective floor legs and with said inside lip, leg and flange of said immediate floor member received in the outside lip, leg and flange of the next adjacent floor member, relative vertical movement between said floor members and said supports is substantially prevented.

5. A floor system as set forth in claim 1 wherein said first support lip of said support has a portion defining [the] *an* upper [edge] *portion* of said first notch disposed above the upper edge of the outside floor lip of said immediate floor member, and wherein said support web has a portion defining [the] *an* upper [edge] *portion* of said second notch disposed above the upper edge of the inside floor lip of said immediate floor member and above the upper edge of the outside floor lip of said next adjacent floor member, said portions of said notches extending out over the floor member lips disposed in their respective notches so as to prevent vertical movement of said floor members with respect to said support and to permit the floor members to be snapped into position on its support thus positively interconnecting said supports to said floor members.

* * * * *